United States Patent [19]

Anderson

[11] Patent Number: 5,550,890
[45] Date of Patent: Aug. 27, 1996

[54] MAGNETICALLY SUPPORTED CATHODE X-RAY SOURCE

[76] Inventor: Waston A. Anderson, 763 La Para Ave., Palo Alto, Calif. 94306

[21] Appl. No.: 467,242

[22] Filed: Jun. 6, 1995

[51] Int. Cl.⁶ .................................................. H01J 35/06
[52] U.S. Cl. ........................ 378/136; 378/131; 378/132
[58] Field of Search .................................. 378/121, 125, 378/131, 132, 139, 144, 136

[56] References Cited

U.S. PATENT DOCUMENTS

| | | | |
|---|---|---|---|
| 2,111,412 | 3/1938 | Ungelenk | 250/35 |
| 2,121,630 | 6/1938 | Gross et al. | 250/34 |
| 4,878,235 | 10/1989 | Anderson | 378/136 |
| 5,200,985 | 4/1993 | Miller | 378/135 |
| 5,241,577 | 8/1993 | Burke et al. | 378/135 |
| 5,274,690 | 12/1993 | Burke et al. | 378/132 |

*Primary Examiner*—Don Wong
*Attorney, Agent, or Firm*—Bella Fishman

[57] ABSTRACT

An X-ray generating source comprising a rotating vacuum envelope with an anode attached thereto and a cathode assembly disposed therewith. The cathode assembly is held stationary within the vacuum envelope exclusively by a magnetic suspension system which comprises a magnet assembly formed by a plurality of electromagnets mounted on two spaced apart rings positioned outside of the envelope and located in the place which is perpendicular to an axis of rotation of the envelope and a magnetic susceptor mounted to the cathode assembly. A plurality of proximity sensors are sensing any displacements of the cathode assembly while a feedback control system being connected to these proximity sensors maintains the proper position of the cathode assembly by changing the value of the magnetic field in gaps between the magnet assembly and the magnetic susceptor.

32 Claims, 5 Drawing Sheets

5,550,890

MAGNETICALLY SUPPORTED CATHODE X-RAY SOURCE

FIELD OF THE INVENTION

This invention relates to X-ray generating source of a rotating anode and stationary cathode and, more particularly, to means for magnetically supporting a cathode of a rotating anode X-ray generating source.

BACKGROUND OF THE INVENTION

X-ray sources of high intensity are in demand for applications ranging from medical imaging to non destructive evaluation and diffraction studies. In X-ray generating sources a cloud of electrons emitted from a cathode are accelerated to high energy and hit an anode target at a focal spot. The anode emits X-rays in response to the incident electrons. When electrons strike the anode surface only a small fraction of their energy is converted to X-rays, while the major portion of the energy is released as heat, thereby elevating the anode temperature in operation. The anodes of fixed anode X-ray sources are generally provided with a cooling fluid or air to remove the heat. Significant heat is generated at the fixed focal spot which limits the energy output or the operation time of the source.

The solution to this problem has been found in rotating the anode of the X-ray device. Rotating anode tubes have largely replaced fixed anodes; see A. Ungelenk U.S. Pat. No. 2,111,412; M. J. Gross et al, U.S. Pat. No. 2,121,630 for examples of such tubes. The use of a rotation anode spreads the heat out over a large area of the target while maintaining a narrow focal spot, and provides increased power output and longer operating times. However, even with the rotation anode design, these tubes continue to provide many problems remain such as suitable anode cooling, inadequate beating life, and problems in manufacture. The aforementioned limitations have tubes modelled after Ungelenk and Gross. In the Ungelenk tube a vacuum tight rotating seal is required to provide the rotary motion to the anode and these seals are found to leak over a period of time. The tube of Gross provides a vacuum tight envelope with the stator of an induction motor outside the vacuum enclosure and its rotor and anode mounted on bearings within the vacuum envelope. A limitation of the Gross tube is that the anode is cooled primarily by thermal radiation which is inefficient except at very high temperatures. Since the anode structure operates in a vacuum environment, the bearings supporting the motor rotor and anode cannot be lubricated after the tube is sealed, which results in a shortened bearing lifetime.

Various solutions have been proposed for correcting these disadvantages. For example, by rotating the entire vacuum enclosure, including the anode which forms part of the rotating structure, a flowing coolant can be circulated directly in back of the anode to provide efficient cooling in a vacuum tight system. Alternatively air cooling can be used by attaching cooling fins to the vacuum rotating vacuum enclosure. In these systems an electron source means must be provided within the rotating enclosure that will focus the electrons on the anode so that the X-rays will be emitted from a position fixed in space. One approach is to use proximity focusing from a hot filament or cathode that is held stationary within the rotating vacuum enclosure. Several structures have been proposed to support the cathode in stationary position within the rotating vacuum enclosure. In U.S. Pat. No. 4,878,235 Anderson uses bellows which rotate with the vacuum envelope, and provide a mechanism to fix the cathode in space by engaging mechanical bearings. In U.S. Pat. Nos. 4,788,705; 5,200,985 and 5,274,690 the cathode is supported on beatings that coincide with the axis of rotation of the vacuum enclosure. A magnetic force produced by a magnet outside of the rotating structure is used to prevent the cathode from rotating.

Although satisfactory in certain respects, the above described designs are disadvantageous in that they require an extreme precision to ensure the axis of the beatings supporting the cathode and the axis of the beatings supporting the rotating vacuum enclosures precisely coincide. Any lateral displacement of these two axes will cause the cathode to move radially as the enclosure is rotated. Any angular displacement of the two axes will cause the cathode to wobble axially so the proximity focusing of the electron beam may be disturbed. Besides, a small amount of friction in the cathode beatings can cause the cathode to wobble azimuthally, particularly when a magnetic field clamp is used. Moreover, in the X-ray tubes which use mechanical beatings within a vacuum enclosure, heat build up in the bearings is a major cause of tubes failure. The bearings are not accessible for lubrication, so that the lubrication applied during manufacture must last the life of the tube. In addition, the lubricants that can be used must have very low vapor pressure so as not to interfere with the operation of the tube. As they wear mechanical bearings often produce noise which is objectional to the personnel near the tube.

SUMMARY OF THE INVENTION

Accordingly, it is an object of the present invention to eliminate the above-described disadvantages associated with conventional cathode support structures of X-ray generating sources. Thus, it is therefore an object of the present invention to provide a rotary-anode type X-ray source with magnetically supported cathode assembly.

It is further an object of the present invention to provide the X-ray source of the above character which utilizes a magnetic suspension system for supporting the cathode from the outside of the vacuum envelope of the X-ray source to provide six constraints to the six degrees of freedom of the cathode assembly.

It is still a further object of the present invention to provide a magnetic suspension system for holding the cathode assembly of X-ray source overcoming the problems of bearing lubrication, bearing noise and limited beating life.

It is yet another object of the present invention to provide a method of suspending the cathode assembly within rotatable vacuum envelope of the rotating anode X-ray generating source.

It is a main advantage of the present invention that a magnetic suspension system is the only system which supports the cathode assembly within the vacuum envelope of the X-ray source.

In accordance with one aspect of the present invention, there is provided an X-ray source which comprises a rotating vacuum envelope with an anode cap section; a first cylindrical wall transparent to radiation, and adjacent to the anode cap section; a second cylindrical wall permeable to magnetic fields and adjacent to the first wall; a cathode cap section adjacent to the second cylindrical wall opposite to the first wall; an anode having a peripheral track and disposed within the anode cap section and fixed to the vacuum envelope; a cathode assembly disposed within the envelope, and comprising: an X-ray cathode for generating a beam of electrons to strike the peripheral track to generate X-rays; a supplementary cathode for emitting electrons mounted on the inside of the cathode cap section; a supplementary anode for receiving the electrons whereby an electric current is produced and conducted to the cathode assembly, the supplementary anode spaced apart from the supplementary cathode and mounted to the cathode assembly; a magnetic suspension system for supporting the cathode assembly, comprising a magnet assembly, having two rings of electromagnets disposed circumferentially of the second cylindrical wall of the vacuum envelope, a magnetic susceptor mounted to the cathode assembly and susceptor made of magnetically susceptive material; a plurality of proximity sensors for sensing a displacement of the cathode assembly along an axis of rotation of the vacuum envelope and wobbling of the cathode assembly about the axis, wherein the magnetic suspension system is preferably operated in a biased mode so that a non-zero magnetic field is maintained in a gap between the magnet assembly and the magnetic susceptor.

In accordance with the other aspect of the present invention there is provided a magnetic suspension system for holding a cathode assembly within a rotating vacuum envelope of an X-ray generating source which comprises a magnet assembly disposed outside of the vacuum envelope in close proximity thereto; a magnetic susceptor mounted to the cathode assembly so as to create gaps between the magnet assembly and the magnetic susceptor, wherein in operation a non-zero magnetic field is maintained in the gaps, a section of the cylindrical wall of the rotary vacuum envelope passing through these gaps; a plurality of proximity sensors positioned on outside of the vacuum envelope above the cathode assembly; a control system connected to the proximity sensors to control a magnetic bias in the gap for preventing motion of the cathode assembly along an axis of rotation of the vacuum envelope and for preventing rotation of the cathode assembly about the axis.

In accordance to the method embodying the present invention, by which the above and other objects and advantages may be accomplished, a cathode assembly is suspended within the rotating vacuum envelope of an X-ray source by employing static and dynamic magnetic forces. According to this method, a magnet assembly is mounted to the outside of the vacuum envelope; a magnetically susceptive material is mounted to the cathode assembly; a plurality of sensors with feedback control system are positioned outside the vacuum envelope in proximity to the cathode assembly; a non-zero magnetic field in a gap between the magnet assembly and the magnetic susceptive material is maintained; a displacement of said cathode assembly along an axis of rotation of the envelope and wobbling the cathode assembly about the axis are sensed and the displacement of the cathode assembly is corrected by adjusting the magnetic field to compensate for the changes of orientation of the cathode assembly.

These and other objectives and advantages of the present invention will become clear from the detailed description given below in which a preferred embodiment is described in relation to the drawings. The detailed description is presented to illustrate the present invention, but is not intended to limit it.

BRIEF DESCRIPTION OF THE DRAWINGS

Embodiments of the present invention are shown by way of pie in the accompanying drawings, wherein.

Figure 1:
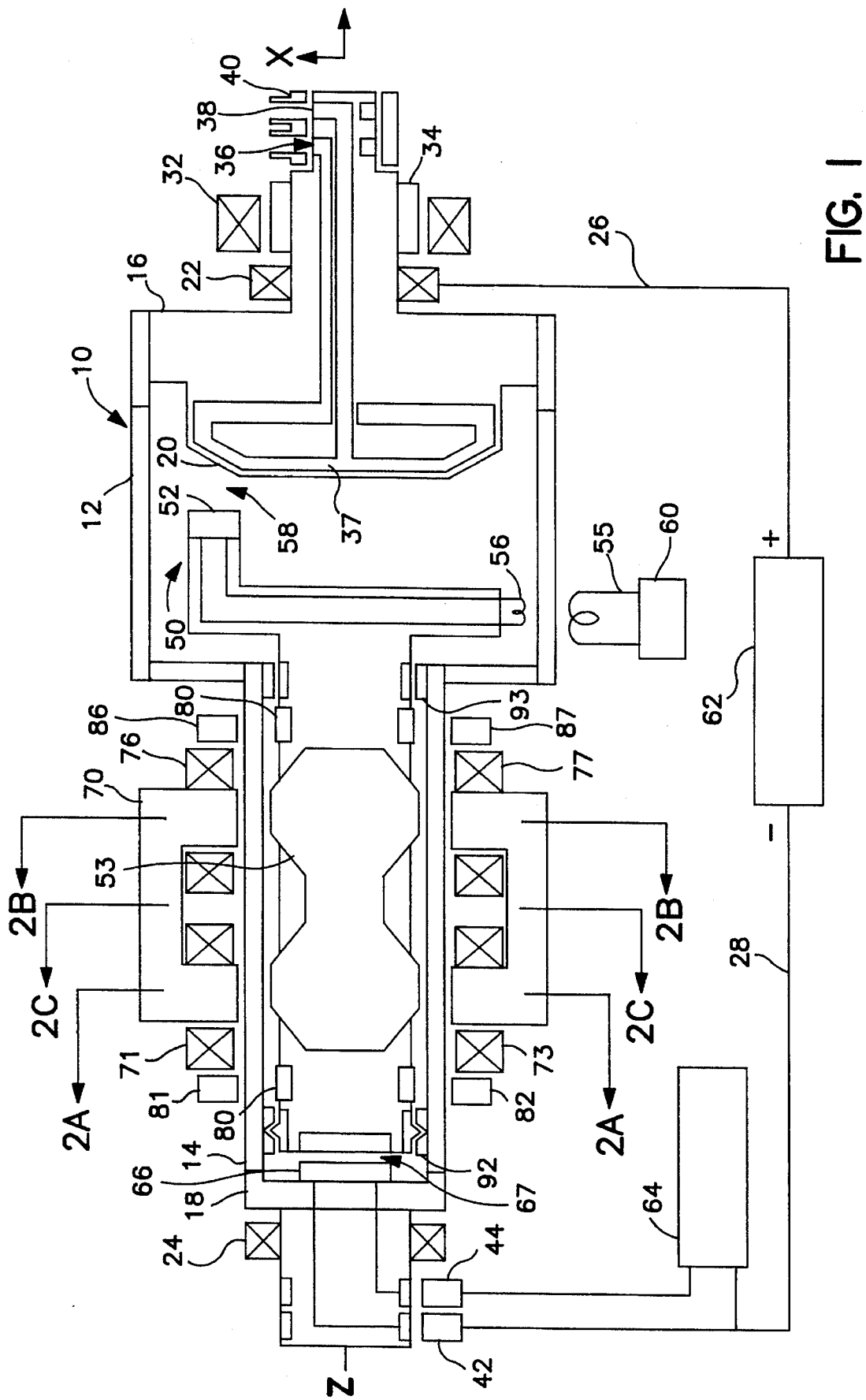
FIG. 1 is a diagrammatic illustration of the X-ray source in accordance with the present invention having a magnetic suspension system for supporting a cathode assembly.

List of items shown in the figures.
10—vacuum envelope
12—cylindrical wall transparent to radiation
14—cylindrical wall permeable to magnetic fields
16—anode end cap section of vacuum envelope
18—cathode end cap section of vacuum envelope
20—X-ray anode track
22—anode bearing
24—cathode bearing
26—wire
28—wire
32—motor stator coils
34—motor rotor member
36—coolant input channel
37—anode coolant channel
38—coolant output channel
40—gland
42—slip ring
44—slip ring
46—slip ring
48—metal plate
50—cathode assembly
52—X-ray cathode
53—magnetic susceptor
55—transformer primary
56—transformer secondary
58—vacuum space
60—X-ray cathode power supply
62—high voltage source
64—supplementary cathode power supply
66—supplementary cathode
67—vacuum space
68—supplementary anode
70—magnet assembly
71—coil cross-section A or D, + X-axis
72—coil cross-section A or D, −X-axis
73—coil cross-section A or D, + Y-axis
74—coil cross-section A or D, −Y-axis
76—coil cross-section B or D, + X-axis
77—coil cross-section B or D, − X-axis
78—coil cross-section B or D, + Y-axis
79—coil cross-section B or D, − Y-axis
80—metal member
81, 82—proximity sensors, on the X-axis, in the A—A plane
83—metal surface
85—proximity sensor, rotation
86, 87—proximity sensors, on the X-axis, in the B—B plane
92, 93—backup bearings
100—controller-amplifier
101—non-inverting input cable to controller-amplifier
102—inverting cable to controller-amplifier
103—non-inverting cable from controller-amplifier 104—inverting cable from controller-amplifier
105—angle encoder
106—circuit
107—cable to controller-amplifiers 100
108—cables to other controller-amplifiers
110—flux lines
111—flux lines
112—bias coils
114—bias permanent magnets
120—bias permanent magnet
131,132—coil pair along +X-axis
133,134—coil pair along -X-axis
135,136—coil pair along +Y-axis
137,138—coil pair along -Y-axis
140—flux lines

DESCRIPTION OF THE PREFERRED EMBODIMENTS

With reference to FIG. 1, an X-ray source includes vacuum envelope 10 defined by cylindrical wall 12 transparent to radiation, cylindrical wall 14 permeable to magnetic fields, anode end cap section 16, and cathode end cap section 18. The vacuum envelope is supported by mechanical bearings 22 and 24 and may be rotated about a Z-axis by motor with stationary stator coils 32 and rotor member 34 fixed to anode end cap 16. Beatings 22 and 24 may be replaced by magnetic bearings if desired. X-ray anode track 20 within vacuum envelope 10 may be cooled by air, water, or other cooling fluid which is in thermal contact with anode track 20. The coolant may be re-circulated from an external heat exchanger (not shown) through rotary gland 40 to input channel 36, through channel 37 behind anode track 20, and output channel 38 in anode end cap section 16 of vacuum envelope 10. The details of constructional and operational characteristics of the cooling system for the high intensity X-ray source are disclosed in Anderson's U.S. Pat. No. 4,788,705 assigned to the assignee of the present invention This patent is incorporated herein by reference.

Cathode assembly 50 located within vacuum envelope 10 comprises X-ray cathode 52 and magnetic susceptor 53. Cathode assembly 50 remains fixed in space, supported by magnet assembly 70 which remains stationary. X-ray cathode 52 may be a hot wire filament, an oxide cathode, a dispenser cathode or other electron beam emitting means, and includes means for focusing the emitted electron beam onto a predetermined region of the X-ray anode track 20. An inductive coupling, such as transformer with primary 55 and secondary 56 coils is provided for conveying electrical energy across the rotating vacuum envelope to cathode assembly 50 to heat cathode 52. X-ray cathode power supply 60 furnishes the AC or RF energy to transformer primary 55. Electrons emitted by cathode 52 travel across vacuum space 58 and strike anode track 20 thereby producing X-rays. The electrical current path is continued by electron flow through the anode end cap section 16, anode bearing 22 through wire 26 to the positive terminal of high voltage source 62. In rotating vacuum envelope supported on magnetic bearings, a slip ring contact provides the electrical path between anode end cap section 16 and wire 26. The electron current path continues from negative terminal of high voltage source 62 through wire 28, slip ring 42 to supplementary cathode 66. Power from supplementary cathode power supply 64 coupled through slip rings 42 and 44 heats supplementary cathode 66. Electrons emitted from supplementary cathode 66 travel across vacuum space 67 to supplementary anode 68, and on to X-ray cathode 52 through wiring in the cathode assembly 50. By controlling the heating power to supplementary cathode 66, the voltage across vacuum space 67 can be maintained at a fairly low value, typically several hundred volts, while the voltage across vacuum space 58 might typically be 140,000 volts. Transferring the power in a non-conductive way from negative terminal of high voltage source 62 to cathode assembly 50 may be performed by any other arrangements known in the art.

The magnetic suspension system which supports cathode assembly 50 comprises magnet assembly 70, magnetic susceptor 53 mounted to cathode assembly 50 and made of magnetically susceptive material, proximity sensors 81, 82, 86 and 87, and an electronic control system. Magnet assembly 70 comprises two rings of electromagnets, an A-ring in the of A—A plane and a B-ring in the B—B plane of FIG. 1. Each ring has 4 or 8 coils on the respective spokes. Some possible arrangements of the 4 coil systems are described in reference to FIGS. 2A, 2B, 3A, 3B, 4B and 4C. A description of the 8 coil system is made in reference to FIG. 6. Proximity sensors and their control electronics are made by a number of companies including Kaman Instrument Corporation of Colorado Springs, Colo., ACVON-Advanced Controls Technology, Inc. Northridge, Calif. and Electro Corporation of Sarasota, Fla. The sensor output is taken to mean the output of the sensor after the sensor signal is processed by its control electronics. The use of electronic control systems with feedback to suspend magnetic bodies have been known in the art. F. T. Holms describes such a system in his paper "Axial Magnetic Suspensions", Key. Sci. Instr. 8, p. 444 (1937). Such systems for the basis for the operation of magnetic bearings. A source of background information about magnetic suspension systems including magnetic bearings is the book "Magnetic Bearings", G. Schweitzer, Ed., Springer Verlag (1988). More recent information is in the publication "Proceedings of MAG '93 Magnetic Beatings, Magnetic Drives and Dry Gas Seals Conference & Exhibition", (July 29–30, 1993 Alexandria, Va.,) Technomec Publishing Co. Inc., Lancaster, Pa.

In operation, cathode assembly 50 is supported magnetically, without any physical contact with the surrounding vacuum envelope 10. Because the electromagnetic actuators that make up this suspension system are open loop unstable, a feedback control system is used to ensure stability. The force between a magnet and magnetic material is inherently attractive. The forces are inversely proportional to the square of the gap between the magnet and the magnetic material. Thus if the magnetic material moves closer to the magnet the force increases causing the material to move still closer until contact is achieved. To provide stable support, closed loop control of the magnet current is required. This is achieved by sensing the position of the magnetic material using at least one proximity sensor. Fiber optic sensors that depend upon reflected or scattered light and eddy current or inductive sensors that depend upon a change of inductance or impedance of a coil driven at a high frequency may be used as proximity sensors. In the preferred embodiment of the present invention, inductive or eddy current sensors can be used. At least one sensor is required to measure each degree of freedom of the cathode assembly with the magnetic susceptor, although typically two sensors are used that are positioned on opposite sides of the supported structures. By using the difference of the output voltage of opposing sensors one minimizes drift and offset signals from the sensors to yield a more precise control signal. The coils that surround the suspended cathode assembly also work in pairs. The suspension system is preferably operated in a biased mode so that a non-zero magnetic field is maintained in the gap between the magnet and magnetic material. The control signal then increases or decreases the magnetic flux in the gap without going through a net flux reversal. This type of operation makes the control system more linear. The magnetic field bias also provides for the stabilization of the position of the cathode assembly, preventing motion along the Z-axis and preventing rotation about the Z-axis.

During operation, cathode assembly 50 is completely supported by the magnetic fields produced by magnet assembly 70 of the magnetic suspension system. When the tube is not operating cathode assembly 50 is supported by backup bearings 92 and 93. Preferably these bearings are made of a tough plastic material such as Kevlar. They also protect the system in case of power failure during operation by providing backup support for cathode assembly 50 while vacuum envelope 10 is still in motion. In normal operation backup bearings 92 and 93 do not provide support to the cathode assembly since no mechanical contact exists between the respective outside parts of the bearings fixed to vacuum envelope 10 and the respective inside part of the bearings fixed to cathode assembly 50.

Figure 2A:
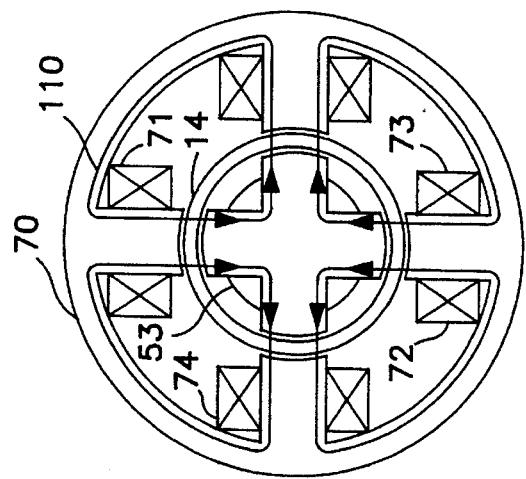
FIG. 2A, 2B and 2C are diagrams showing three cross sectional regions of FIG. 1 and illustrate magnetic field bias flux.
Figure 2B:
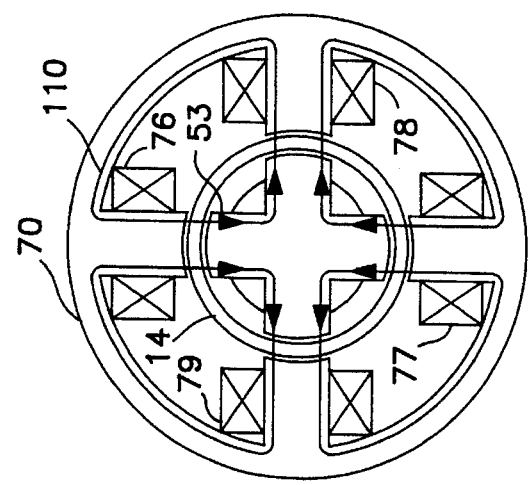

FIGS. 2A and 2B show two cross sectional views of the X-ray source taken at the planes indicated by the lines A—A and B—B respectively of FIG. 1. In FIG. 2A, coils 73 and 74 are positioned along the Y-axis and angularly displaced by 90 degrees from coils 71 and 72 respectively which are positioned along the X-axis. Each pair of coils 71–72 and 73–74 is mounted to the respective pair of facing spokes. Bias fields are established by flowing positive currents through coils 71 and 72 and negative currents through coils 73 and 74. Lines 110 indicate the path and direction of the magnetic flux lines created by the bias currents through these coils. The convention relating the sign of the coil current and the direction of the flux lines is that a positive current through any of the coils causes flux lines to have a direction from the outside of magnet assembly 70 toward the inside. In FIG. 2B coils 78 and 79 are angularly displaced by 90 degrees form coils 76 and 77 respectively. Bias fields are produced by flowing positive currents through coils 76 and 77 and negative currents through 78 and 79. Lines 110 indicate the path and direction of the magnetic flux lines created by the bias currents through these coils.

Figure 5:
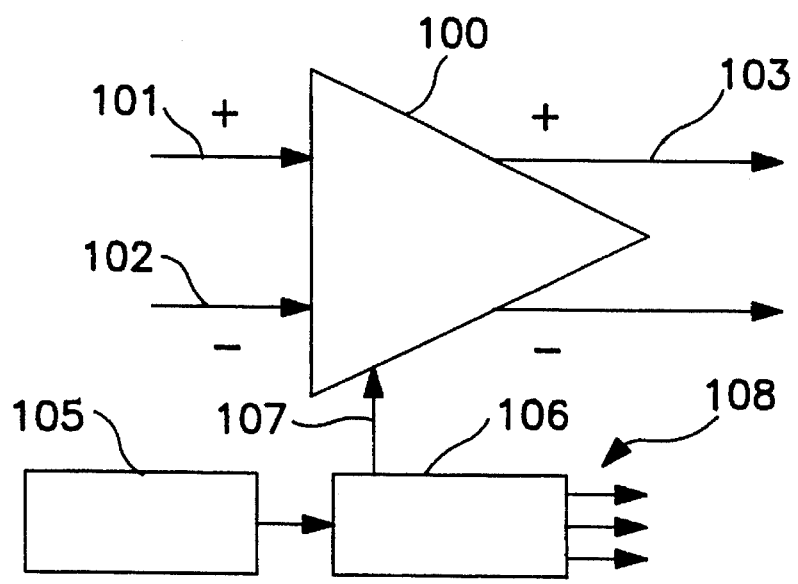
FIG. 5 is a illustration of the electrical connectional relationship of the proximity detectors and the coils used for the magnetic suspension system.

The source of the electrical currents to drive the coils is derived from controller-amplifier 100 shown in FIG. 5. The electrical currents have two components, a fixed component which produces the bias fields, and a variable component which controls and maintains a stable position of cathode assembly 50.

Proximity sensors 81, 82, 86 and 87 (FIG. 1 ) remain fixed while the magnetically transparent wall 14 of vacuum envelope 10 rotates. The sensors with control electronics provide a voltage output that depends upon the distance of the respective sensor to the nearby respective metal surface of member 80 fixed to cathode assembly 50. Member 80 is composed of an electrical conducting material such as aluminum. If, for example, cathode assembly 50 moves in the negative X-direction, or down in plane A—A of FIG. 1, the voltage output of sensor 81 increases as the gap between the sensor and the plate increases and voltage from sensor 82 decreases as the gap between it and the respective plate decreases. These two sensor outputs are coupled to controller-amplifier 100 (FIG. 5), where sensor 81 coupled to the non-inverting input cable 101 of controller-amplifier 100 and sensor 82 coupled to the inverting input cable 102. These signals combine in controller-amplifier 100 to produce a positive output signal on cable 103 which is connected to coil 71 thereby further increasing its magnetic flux. A negative output signal appears on cable 104 which is connected to coil 72 thereby decreasing its magnetic flux. The net increase of flux through coil 71 and the net decrease from coil 72 will tend to restore the cathode assembly to its original position. In a similar way coils 76 and 77 receiving inputs derived from sensors 86 and 87 tends to restore vertical movement of the cathode assembly in the plane of the B—B cross section. By reducing or preventing vertical movement in these two planes precludes any displacement or tilting of cathode assembly 50 in the vertical plane, i.e. reduce or prevent motion in the X-direction and rotation about the Y-axis.

Horizontal motions of cathode assembly 50 are controlled by a similar arrangement of magnetic coils and sensors along the Y-axis in the two planes A—A and B—B. These coils are 73 and 74 in cross section A—A (FIG. 2A) and 78 and 79 in cross section B—B (FIG. 2B). Along with their controller-amplifiers and sensors (not shown) they form a control system to restrict or greatly reduce or preclude any motion or tilting of the cathode assembly 50 in the horizontal direction of FIG. 1, i.e. greatly reduce motion in the Y-direction and rotation about the X-axis.

The above described system provides active restoring forces restricting 4 degrees of freedom: motion along the X- and Y- axes, and rotation about the Y- and X- axes. Passive magnetic clamping is also provided by the bias fluxes that prevents motion along the Z-axis, or rotation about the Z-axis. As can be seen in FIG. 2A and 2B any rotation of magnetic susceptor 53 about the Z-axis increases the magnetic path length of the flux lines and thereby increasing the magnetic energy, causing a restoring force. In a similar way, as can be seen in FIG. 1, any motion along the Z-axis also increases the magnetic energy, causing a restoring force.

Figure 2C:
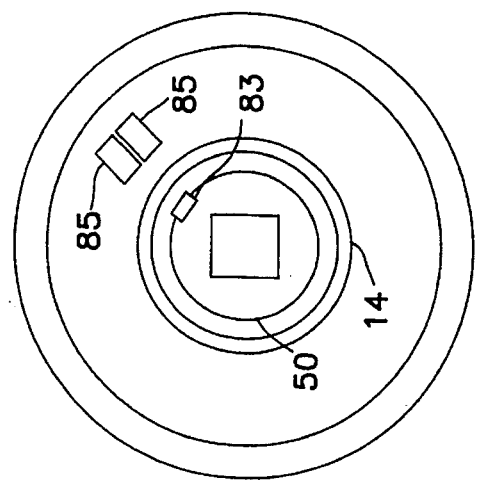

Means are provided to position cathode assembly 50 to be in the correct angular quadrant so when power is applied to magnet assembly 70 the cathode is correctly positioned. Refer now to FIG. 2C which is a cross section taken at C—C of FIG. 1. Metalized spot 83 located on cathode assembly 50 is directly under sensors 85 when the X-ray cathode is in the correct position for operation. Before magnet assembly 70 is energized, vacuum envelope 10 is slowly rotated which causes cathode assembly 50 to rotate with it. When sensors 85 detect metalized spot 83 power is applied to magnet assembly 70 causing cathode assembly 50 to be suspended within vacuum envelope 10. The speed of the rotation of vacuum envelope is then increased and high voltage power is switched on to produce X-rays.

Refer now to FIG. 5 which shows a circuit illustrating the principles of operation of the feedback control system. In the system described above, four such controller-amplifier systems as shown in FIG. 5 are required corresponding to sensors which control the four degrees of freedom that are stabilized with active feedback. Controller-amplifier 100 may use combinations of analog and digital circuits, including digital signal processors. Its design must take into account the particular physical and electrical properties of the proximity sensors, the magnetic coils, the magnetic materials, the magnetic circuit, and the various physical dimensions and mass distribution of the suspended cathode assembly. It must also supply the proper bias currents magnet coils. The design of electromechanical feedback systems are a well known art. See, for example, "Control System Synthesis", John G. Truxal, McGraw-Hill (1955) or "Digital Control of Dynamic Systems", G. F. Franklin, J. D. Powell & M. L. Workman, Addison-Westley Publishing Company (1990).

In addition to providing stable feedback and damping characteristics, the controller-amplifier may also receive feed-forward information about the system that incorporates the X-ray source. In systems where the orientation of the X-ray source is changed during operation, a signal with orientation information is fed to controller-amplifier that adjusts the currents in the coils to compensate for the change of orientation and maintain the position of cathode assembly 50. This orientation information is obtained from one or more angle encoders 105, is processed by circuit 106 to yield feed-forward signal via cable 107 to amplifier-controller 100 and via cables 108 to other amplifier-controllers for control of the current in the appropriate magnet coils. For example, in CT scanners the X-ray source is located in a gantry that rotates about the patient being examined. This rotation can have two adverse effects upon the X-ray source. First the direction of the earth's gravitational field with respect to the suspended cathode changes as the X-ray source rotates. Second, there is a centrifugal force on the cathode assembly proportional to the distance the assembly is from the axis of rotation, the mass of cathode assembly, and the square of the rotational angular velocity. Better stabilization of the suspended cathode assembly 50 is achieved by using this information. Angle encode encoders 105 that is fixed to the rotatable gantry detects the gantry orientation and rotational speed. This information is coupled to circuit 106 which develops compensation signals that are fed to each of the four amplifier-controllers. The compensation signals take into account the centrifugal force on cathode assembly 50 and the direction of the Earth's gravitational field with respect to the suspended cathode assembly 50 as the gantry rotates. Correction signals for each controller-amplifier are developed by circuit 106 and coupled to the appropriate controller-amplifiers by cables 107 and 108. The controller-amplifiers apply currents to the coils they control and thereby adjust magnetic field strength that support the cathode assembly to compensate for the apparent changing direction of the earth's gravitational field and for the centrifugal force.

Figure 3B:
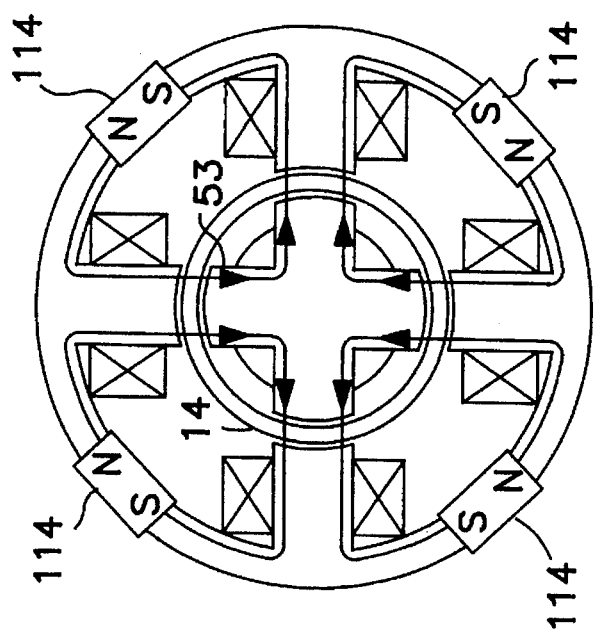
FIGS. 3A and 3B are diagrams showing an alternative arrangements to generate the magnetic field bias flux.
Figure 3A:
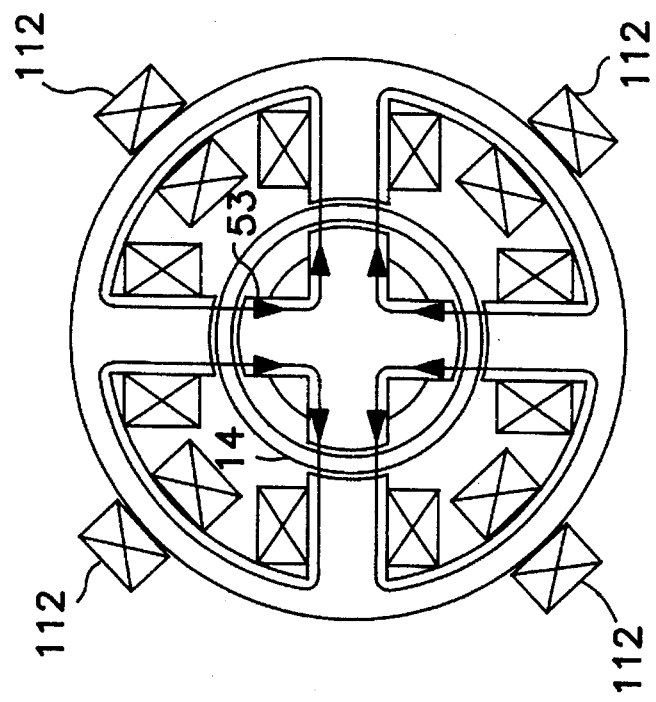

In the system described above with reference to FIGS. 2A and 2B the same coils 71–74 in the A-ring and 76–79 in the B-ring were used to produce the bias and control magnetic fields. Both the bias and control currents to produce these fields are produced by controller-amplifiers 100. In FIGS. 3A and 3B the control fields are still produced by coils 71–74 in the A-ring and 76–79 in the B-ring which are driven by currents from controller-amplifiers 100. There are a number of alternative ways to generate the magnetic bias fields. In FIG. 3A the bias field are generated by using separate coils 112 in the outside periphery of magnet assembly 70. The structure shown in FIG. 3A represents that alternative structure used in both the A-ring and B-ring of FIG. 1. Currents that drive bias coils 112 are generated by a separate power supply (not shown).

Another alternative arrangement for generating the magnetic bias fields is with permanent magnets. Permanent magnets 114 of FIG. 3B are used at the outer periphery in place of coils of FIG. 3A. "N" refers to North-seeking poles and "S" to South-seeking poles. With permanent magnets no auxiliary power supply is required and the controller-amplifiers 100 need not furnish bias current. Coils 112 of FIG. 3A and permanent magnets 114 of FIG. 3B produce the same pattern of magnetic flux as that produced by the magnet coils of FIGS. 2A, and 2B.

Figure 4B:
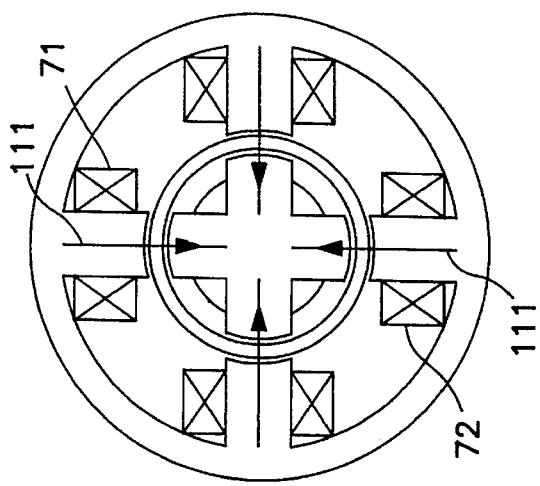
FIG. 4A, B and C are partial diagrams of an alternative embodiment of FIG. 1 illustrating an alternative embodiment to generate the magnetic field bias flux and method of providing electrical current to the X-ray cathode.
Figure 4C:
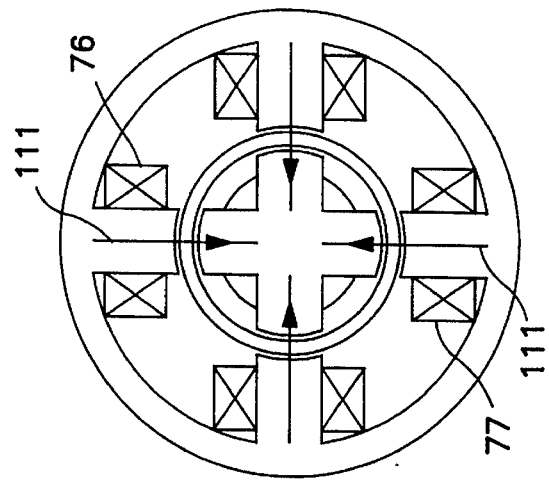
Figure 4A:
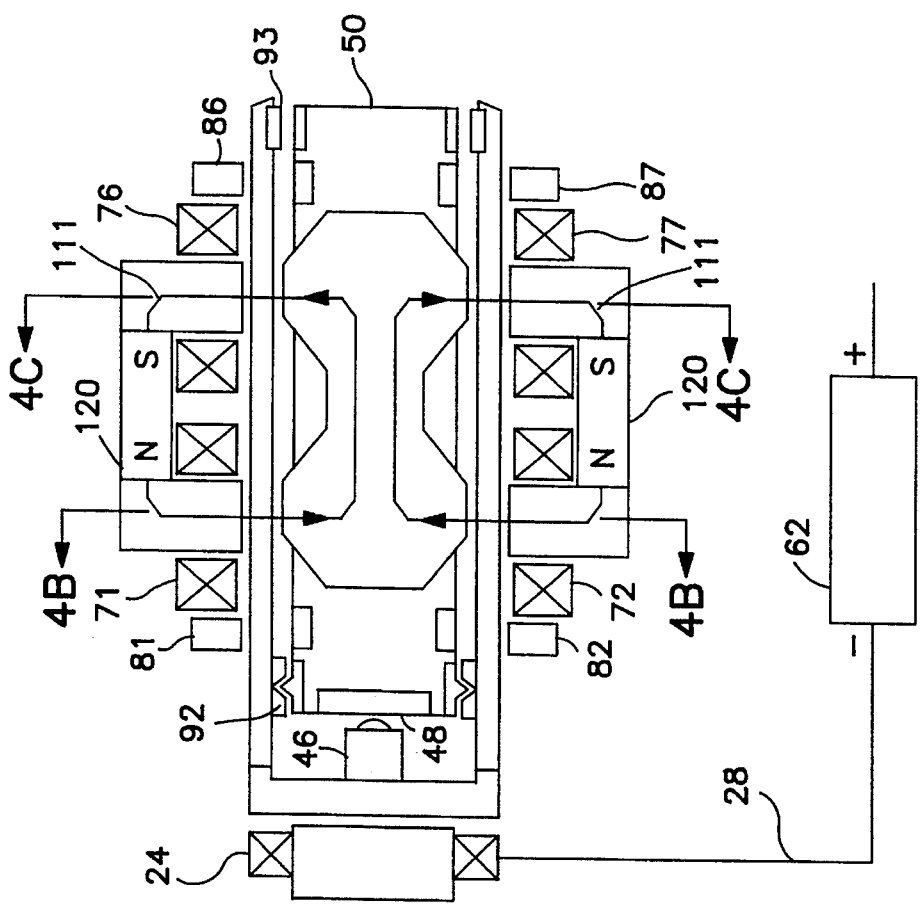

FIG. 4A illustrates an alternative embodiment employing permanent magnets to produce the bias fields. In FIG. 4A only the left hand portion of the X-ray source is drawn as the right-hand portion is the same as that shown in FIG. 1. Permanent magnets 120 are used to produce the bias fields. Permanent magnets 120 extend from the periphery of the ring in section E—E to the ring in section D—D. Typically four permanent magnets are used, spaced every 90 degrees around the ring. More permanent magnets can be used if desired, or a single permanent magnet in the form of a short cylinder can be used. Flux paths 111 from this arrangement is different from the others discussed above. Account must be taken of the directions of the bias flux lines through the coils when determining the connections between the controller-amplifiers and the coils. To generate a force tending to close the gap between a coil and the cathode assembly the coil current must flow in a direction that increases the magnetic flux through the coil. To increase the gap the current in the coil current must flow in a direction to produce a flux counter to the bias flux threading the coil. Magnet assembly 70 with permanent magnets 120 operates as explained with reference to FIG. 1.

With permanent magnet biasing the orientation of the cathode assembly remains clamped even with no power supplied to the system. The orientation is correctly selected when the X-ray vacuum envelope 10 is inserted into the magnet assembly 70, either during manufacture or field replacement. With permanent magnets of sufficient strength the correct orientation will survive a power failure while vacuum envelope 10 is rotating. In these systems the orientation sensing of FIG. 2C is not required.

FIG. 4A also illustrates an alternative way of completing the electrical circuit to allow electron current to flow from the negative terminal of high voltage power supply 62 through wire 28 to bearing 24, through slip ring 46 to metal plate 48 and then by wiring in cathode assembly 50 to the X-ray cathode (not shown in FIG. 4). Slip ring 46 is very lightly spring loaded so it does not substantially displace cathode assembly 50.

In the systems described above, the magnetic flux produced by one coil had its return path threaded through another coil. This produces a relatively simple system with an economy of coils. For some applications, particularly those that use a magnetic flux density that approaches the saturation limit of the magnetic material, it is better to have a separate flux return path that does not thread the other magnet coils. Close to saturation, magnetic material is non-linear which can cause some interaction between forces applied in different directions.

Figure 6:
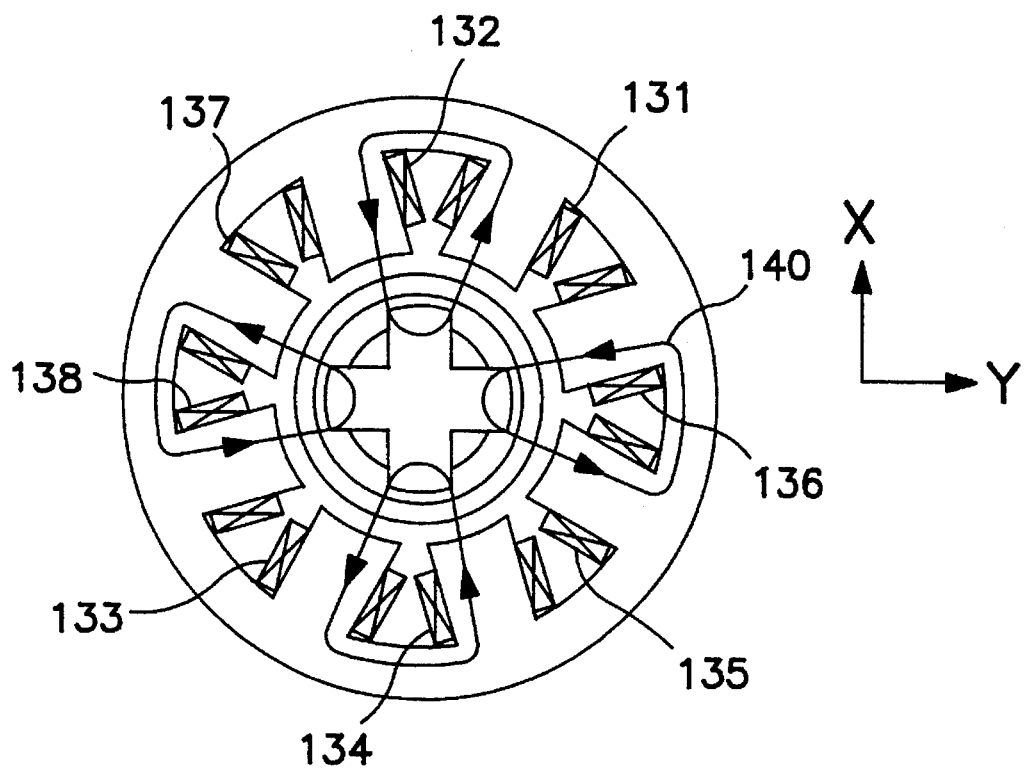
FIG. 6 is a partial diagram of an alternative embodiment of FIG. 1.

FIG. 6 is a partial cross-sectional view of an X-ray source in accordance with the present invention having independent flux return paths for each of the separate electromagnet drivers of the magnetic suspension system supporting the cathode assembly. For this X-ray source the broadside cross section view is the same as for the X-ray source of FIG. 1, however coil pairs are used to generate the magnetic fields in place of the single coil of FIGS. 2A, 2B, 3A, 3B, 4B and 4C. FIG. 6 is a partial view of magnet assembly 70 as viewed in cross sections A—A and B—B of FIG. 1 wherein both the A- and B-rings have eight coils. Bias currents from the controller-amplifiers are passed through coils 131 to 138 to produce bias fields with magnetic flux directions as indicated by flux lines 140. By increasing the flux through neighboring coils 13 1 and 132 and/or decreasing the flux coil pair 133 and 134 in both the A- and B-rings increases the force on cathode assembly tending to move it in the up direction, i.e. along the +X-axis. By increasing the flux through coils 13 1 and 132 in the B-ring and decreasing the flux through coils 13 1 and 132 in the A-ring tilts the cathode assembly in the vertical plane. By similarly by increasing the flux through coils 135 and 136 and/or decrease the flux through coils 137 and 138 in both the A- and B-rings increases the horizontal force on cathode assembly 50 moving it in the horizontal or Y-direction. By flowing these currents in the opposite sense in the second plane causes a tilt of the cathode assembly.

In addition the angle of the cathode assembly about the Z-axis can be controlled by the same coils with an additional controller-amplifier. For example by increasing the flux through coils 131,135, 133 and 137 and/or decreasing the flux through coils 132, 136, 134 and 138 causes a clockwise rotation of cathode assembly 50 as viewed in FIG. 6. Active control of this angle about the Z-axis is achieved by Using signals from sensors 85 (FIG. 2C) coupled through controller-amplifier 100 to the respective coils of FIG. 6.

Using the same general principles as outlined above one can apply the same techniques to achieve active control of the position of cathode assemble along the Z-axis. Two additional sensors similar to 85 in FIG. 2C, but placed along the Z-axis straddling section C—C of FIG. 1 will detect the position of the cathode assembly along the Z-axis. A magnetic forces along the Z-direction is obtained without any additional coils by building the X-ray source using a slightly greater distance along the Z-axis of the coils in the A- and B-rings, and a slightly smaller distance between the corresponding enlarged sections of the magnetic material 53. An increase of the flux density in all of the coils in the B-ring and/or a decrease of the flux density of all coils in the A-ring causes cathode assembly 50 to move in the +Z direction, thereby decreasing slightly the spacing between X-ray cathode 52 and anode track 20. A decrease of the flux density of all of the coils in the B-ring and/or an increase of the flux density of all coils in the A-ring will cause cathode assembly 50 to move in the –Z direction, thereby increasing slightly the spacing between X-ray cathode 52 and X-ray anode track 20. Dynamic stabilization of cathode assembly 50 along the Z-axis is obtained by the same technique of using sensor information to input to a controller-amplifier that applies its output to all of the coils in the A- and B-rings of magnet assembly 70.

This 8 pole magnet assembly described with reference to FIG. 6 can also be modified to include separate bias coils by inserting them into the outer periphery of the magnet assembly as is illustrated for the 4 pole illustrated by FIG. 3A. At least 4 bias coils inserted between every other pole are needed for each cross section. Alternatively 8 bias coils can be used inserted between each pole of FIG. 6. With separate bias coils an additional power supply is required to drive them.

A permanent magnet bias can also be used with an 8 pole magnet assembly. In this case at least 4 permanent magnets are use to furnish bias fields to each cross section. For example, permanent magnets could be inserted on the periphery as was done in FIG. 3B but between every other pole requiring 4 permanent magnets for each of the two rings or a total of 8 permanent magnets. Alternatively permanent magnets could be inserted on the periphery between every pole requiring a total of 16 permanent magnets. Permanent magnet biasing of the 8 pole design can also be carried out using the system outlined in FIG. 4A. As was described for that system, either a number of small magnets could be inserted between the two planes or a single ring-shaped magnet could be used.

Apparatus and methods have been described that permit the suspension and support of an X-ray cathode assembly within an enclosed rotating vacuum envelope without any mechanical support. All of the support has been obtained through static and dynamic magnetic forces. It will be recognized by those skilled in the art that many different embodiments may occur within the scope of the invention. For example optical sensors could be used to determine the position of the cathode assembly. Bias magnetic fields may be generated by many different configurations.

What is claimed is:

1. An X-ray source comprising:
   (a) a rotating vacuum envelope, said envelope having an anode cap section;
   (b) a first cylindrical wall transparent to radiation, said first wall adjacent to said anode cap section;
   (c) a second cylindrical wall permeable to magnetic fields adjacent to said first wall;
   (d) a cathode cap section adjacent to said second cylindrical wall opposite to said first wall;
   (e) an anode disposed within said anode cap section and fixed to said vacuum envelope said anode having a peripheral track;
   (f) a cathode assembly disposed within said envelope, said cathode assembly comprising:
   an X-ray cathode for generating a beam of electrons to strike said peripheral track to generate X-rays, said X-rays being transmitted through said first wall;
   a supplementary cathode for emitting electrons, said supplementary cathode mounted on the inside of said cathode cap section;
   a supplementary anode for receiving said electrons, whereby an electric current is produced and conducted to said cathode assembly, said supplementary anode spaced apart from said supplementary cathode and mounted to said cathode assembly;
   (g) a magnetic suspension system for supporting said cathode assembly, said suspension system being the only support for said cathode assembly comprising:
   a magnet assembly, said magnet assembly having two rings of electromagnets disposed circumferentially of said second cylindrical wall of said vacuum envelope;
   a magnetic susceptor mounted to said cathode assembly, said susceptor made of magnetically susceptive material, wherein said magnetic suspension system is preferably operated in a biased mode so that a non-zero magnetic field is maintained in gaps between said magnet assembly and said magnetic susceptor; and
   (h) a plurality of proximity sensors for sensing a displacement of said cathode assembly within said vacuum envelope.

2. The X-ray source of claim 1, further comprising a system for generating magnetic bias fields with magnetic flux passing through said electromagnets of said magnet assembly.

3. The X-ray source of claim 2, wherein each said ring of said magnet assembly comprises two pairs of spokes, each said spoke is angularly displaced by 90 degrees from each neighboring spoke, each said spoke has a coil mounted thereto.

4. The X-ray source of claim 2, wherein each said ring of said magnet assembly comprises four pairs of spokes each said spoke is equally angularly displaced from adjacent spoke, each said spoke has a coil mounted thereto.

5. The X-ray source of claim 3, wherein said generating system comprises a plurality of additional coils positioned on the periphery of said rings of said magnetic assembly between each two neighboring spokes of said rings.

6. The X-ray source of claim 3, wherein said generating system comprises a plurality of permanent magnets, each said permanent magnet positioned at the outer periphery of said magnet assembly between each pair of neighboring spokes of said ring so as a pole of each said magnet facing the pole of adjacent magnet with like polarity.

7. The X-ray source of claim 1, further comprising a system for disposing said cathode assembly in operating position, said system comprising a metalized spot located on said cathode assembly and a pair of sensors positioned above said spot between said magnet assembly and said vacuum envelope, wherein in operation said sensors detect said spot and power is applied to said magnet assembly for controlling the position of said cathode assembly within said vacuum envelope.

8. The X-ray source of claim 1, further comprising a feedback control system, said control system comprising a plurality of controller-amplifiers for producing the bias and control of magnetic fields of said electromagnets, each said controller-amplifier coupled to each said proximity sensor, wherein in operation a signal from said sensor is fed to said controller-amplifier for adjusting the current in said coils to maintain the position of said cathode assembly.

9. The X-ray source for claim 1, further comprising backup bearings, said backup bearings have respective outside parts fixed to the inside of said second cylindrical wall and respective inside parts fixed to said cathode assembly, wherein, in operation said outside and inside parts are spaced apart.

10. The X-ray source of claim 1, further comprising:
    (a) a high voltage source for maintaining a potential between said rotating anode and said X-ray cathode;
    (b) an X-ray cathode power supply for heating said X-ray cathode; and
    (c) a supplementary cathode power supply for heating said supplementary cathode 1.

11. An X-ray source comprising:
    (a) a vacuum envelope, said vacuum envelope rotating about an axis;
    (b) a cathode assembly for generating an electron beam, said cathode assembly disposed within said vacuum envelope;
    (c) an anode assembly fixed to said vacuum envelope in proximity to said cathode assembly, said anode assembly comprising an anode target for receiving said electron beam and producing X-rays;
    (d) a magnetic suspension system for supporting said cathode assembly, said suspension system comprising two rings of electromagnets disposed outside said vacuum envelope in two respective proximate planes normal to said axis of rotation of said vacuum envelope and magnetic susceptor mounted to said cathode assembly, wherein said suspension system is the only system for holding said cathode assembly stationary by static and dynamic magnetic forces which are maintained in gaps between said electromagnets and said magnetic susceptor;
    (e) a high voltage source for maintain a potential between said anode assembly and said cathode assembly; and
    (f) a system for transmitting electrical current from said high voltage source to said cathode assembly across a vacuum space between said cathode assembly and said vacuum envelope, said transmitting system comprising a first and a second spaced apart electrodes positioned on the inside of said vacuum envelope and said cathode assembly respectively, wherein in operation said first electrode is to be maintained at a negative voltage relative to said second electrode to provide an electron flow between said first and second electrodes.

12. An X-ray source comprising:
    (a) a vacuum envelope, said vacuum envelope being rotatable about an axis;
    (b) an anode assembly having a target, said anode assembly being fixed to an inside of said vacuum envelope for rotation about said axis;
    (c) a cathode assembly, said cathode assembly disposed within said vacuum envelope in proximity to said anode assembly for generating and focusing a beam of electrons onto a surface of said target for producing X-rays; and
    (d) a magnetic suspension system for holding said cathode assembly stationary within said rotating vacuum envelope, said magnetic suspension system comprising an active magnetic means positioned outside said vacuum envelope, a magnetic susceptor placed to said cathode assembly for creating magnetic fields between said active magnetic means and said magnetic susceptor to constrain the motion of said cathode assembly for creating magnetic fields between said active magnetic means and said magnetic susceptor to constrain the motion of said cathode assembly in at least two angular directions about a horizontal and a vertical axis in the plane perpendicular to said axis of rotation of said envelope or along said axis of rotation of said envelope, and an active magnetic feedback system to constrain the motion of said cathode assembly in two angular directions about said horizontal and vertical axes and two linear directions along said horizontal and vertical axes.

13. The X-ray source of claim 12, wherein said magnetic suspension system further comprises a passive magnetic feedback to constrain the motion of said cathode assembly along and about said axis of rotation of said vacuum envelope.

14. An X-ray source comprising:
    (a) a housing forming a vacuum enclosure, the entirety of said enclosure being rotatable about an axis, a portion of said enclosure being an anode;
    (b) means rotating said enclosure about said axis;
    (c) cathode means mounted within said enclosure for generating electrons and focusing said electrons onto an anode region off of said axis; and
    (d) magnetic field means for holding said cathode within said enclosure, said magnetic field means comprising a combination of active magnetic feedback and passive magnetic feedback utilizing magnetic fields to constrain cathode motion in at least two angular or linear directions.

15. The X-ray source of claim 14, wherein said magnetic field means comprises active feedback to constrain four degrees of freedom of cathode motion, and static magnetic field means to constrain the other 2 degrees of freedom of cathode motion.

16. The X-ray source of claim 14, wherein said magnetic field means comprises active feedback to constrain five degrees of freedom of cathode motion and static magnetic field means to constrain the other 1 degree of freedom.

17. The X-ray source of claim 14, wherein said magnetic field means comprises active feedback to constrain the six degrees of freedom of cathode motion.

18. The X-ray source of claim 17, wherein one or more degrees of freedom of cathode motion are constrained by an active feedback system that comprises bias fields generated by magnetic coils that are separate and independent from coils used to generate the feedback signal.

19. The X-ray source of claim 17, wherein one or more degrees of freedom of cathode motion are constrained by an active feedback system that utilizes bias fields generated by permanent magnets.

20. The X-ray source of claim 14, wherein one or more degrees of freedom of cathode motion are constrained by an active feedback system that comprises bias fields generated by magnetic coils that are separate and independent from coils used to generate the feedback signal.

21. The X-ray source of claim 14, wherein one or more degrees of freedom of cathode motion are constrained by an active feedback system that utilizes bias fields generated by permanent magnets.

22. A magnetic suspension system for holding a cathode assembly within a rotating vacuum envelope of an X-ray source comprising:

(a) a magnet assembly disposed outside of said vacuum envelope in close proximity thereto;

(b) a magnetic susceptor mounted to said cathode assembly so as to create gaps between said magnet assembly and said magnetic susceptor, wherein in operation a non-zero magnetic field is maintained in said gaps;

(c) a plurality of proximity sensors positioned on outside of said vacuum envelope around said cathode assembly; and (d) a control system connected to said proximity sensors to control a magnetic field in said gap for preventing motion of said cathode assembly along an axis of rotation of said vacuum envelope and for preventing rotation of said cathode assembly about said axis.

23. The magnetic suspension system for holding a cathode assembly of claim 22, wherein said magnet assembly comprises a pair of rings spaced apart and disposed along said axis of rotation, each said ring has a plurality of pairs of electromagnets disposed in the plane perpendicular to said axis of rotation of said vacuum envelope and angularly displaced there between.

24. The magnetic suspension system of claim 23, wherein said ring comprises two pairs of electromagnets, said electromagnets of each pair are symmetrically disposed about said axis of rotation of the vacuum envelope and each pair of electromagnets are positioned on a first and a second axis, said axes are angularly displaced by 90 degrees therebetween.

25. The magnetic suspension system of claim 23, wherein said ring comprises four pairs of electromagnets, said electromagnets of each pair are radially disposed with respect to said axis of rotation of said vacuum envelope and each said respective electromagnet is positioned on a respective spoke, said spokes are equally angularly displaced therebetween.

26. The magnetic suspension system of claim 22, further comprising a positional and orientational sensing system for sensing an angular and/or linear accelerations of said X-ray source and at least one controller-amplifier for receiving a signal from said positional and orientational sensory system, and providing an electrical current to said magnet assembly for maintaining said cathode assembly in operational position.

27. A method of suspending a cathode assembly within rotatable vacuum envelope of an X-ray source by employing static and dynamic magnetic forces, comprising the steps of:

(a) mounting a magnet assembly to the outside of said vacuum envelope in proximity to said cathode assembly;

(b) mounting a magnetically susceptive material to said cathode assembly;

(c) positioning a plurality of sensors with feedback control system outside said vacuum envelope in proximity to said cathode assembly;

(d) maintaining a non-zero magnetic field in a gap between said magnet assembly and said magnetic susceptive material;

(e) sensing a displacement of said cathode assembly along an axis of rotation of said envelope and wobbling said cathode assembly about said axis; and (f) correcting said displacement of said cathode assembly by adjusting said magnetic field to compensate for the changes of orientation of said cathode assembly.

28. The method of suspending a cathode assembly of claim 27, wherein said step of mounting a magnet assembly further comprising the step of:

disposing circumferentially two respective rings of electromagnets about said vacuum envelope in proximity to said cathode assembly in two respective planes normal to said axis, wherein each ring comprises at least two pairs of said electromagnets.

29. The method of suspending a cathode assembly of claim 28, wherein said electromagnets are coils which are angularly displaced therebetween, each said coil being placed on a spoke of said ring.

30. The method of suspending a cathode assembly of claim 28, wherein said step of correcting of the displacement of said cathode assembly comprises the step of adjusting the current in said coils so as to decrease or increase the value of magnetic field in said gap without changing its predetermined direction.

31. The method of suspending a cathode assembly of claim 30, further comprising the steps of:

(a) positioning a metalized spot on said cathode assembly;

(b) positioning of at least one proximity sensor outside said vacuum envelope directly above said metalized spot; and (c) detecting said metalized spot by said proximity sensor for placing said cathode assembly in the correct position for operation.

32. The method of suspending a cathode assembly of claim 31, further comprising the step of:

installing backup bearings inside said vacuum envelope, wherein respective outside parts of said bearings are fixed to the inside wall of said vacuum envelope, and respective inside parts of said bearings are fixed to said cathode assembly, said inside and outside parts of each said bearing are in an opposed relationship therebetween.

* * * * *

UNITED STATES PATENT AND TRADEMARK OFFICE
CERTIFICATE OF CORRECTION

PATENT NO. : 5,550,890

DATED : August 27, 1996

INVENTOR(S) : Weston A. Anderson

It is certified that error appears in the above-indentified patent and that said Letters Patent is hereby corrected as shown below:

On the title page: change the Inventor's first name from "Waston" to --Weston--.

Signed and Sealed this

Nineteenth Day of November, 1996

Attest:

BRUCE LEHMAN

Attesting Officer     Commissioner of Patents and Trademarks